United States Patent [19]

Ohshima et al.

[11] Patent Number: 5,538,808
[45] Date of Patent: Jul. 23, 1996

[54] SODIUM SULFUR CELL AND PROCESS OF MANUFACTURING THE SAME

[75] Inventors: Masaaki Ohshima; Akira Kobayashi, both of Tokyo; Akihiko Yoshida, Aichi Pref, all of Japan

[73] Assignees: The Tokyo Electric Power Co., Inc.; NGK Insulators, Ltd., both of Japan

[21] Appl. No.: 314,448

[22] Filed: Sep. 28, 1994

Related U.S. Application Data

[63] Continuation of Ser. No. 555,633, Jul. 23, 1990, abandoned.

[30] Foreign Application Priority Data

Jul. 21, 1989 [JP] Japan .................................. 1-187481

[51] Int. Cl.⁶ .................................................. H07M 110/39
[52] U.S. Cl. ........................ 429/104; 429/218; 29/623.1
[58] Field of Search .................................. 429/104, 193, 429/209, 218; 29/623.1

[56] References Cited

U.S. PATENT DOCUMENTS

| | | | |
|---|---|---|---|
| 3,607,405 | 5/1971 | Christopher | 136/20 |
| 4,146,684 | 3/1979 | Fisher et al. | 429/104 |
| 4,220,691 | 9/1980 | Roth et al. | 429/104 |

FOREIGN PATENT DOCUMENTS 224932  6/1987  European Pat. Off. .

OTHER PUBLICATIONS

Patent Abstracts of Japan, vol. 11, No. 110 (E–496) [2557], Apr. 7, 1987; & JP-A-61 259 457 (Hitchi Ltd.) Nov. 17, 1986.

Patent Abstacts of Japan, vol. 12, No. 304 (E–646) [3151], Aug. 18, 1988; & JP-A-63 72 073 (Hitachi Ltd.) Apr. 1, 1988.

Patent Abstracts of Japan, vol. 12, No. 486 (E–695) [3333], Dec. 19, 1988; & JP-A-63 202 866 (Hitachi Ltd.) Aug. 22, 1988.

Patent Abstracts of Japan, vol. 7, No. 251 (E–209) [1396] Nov. 8, 1988; & JP-A-58 137 974 (Hitachi Seisakusho K. K.) Aug. 16, 1983.

Chemical Abstracts, vol. 102, No. 2, Jan. 1985, p. 178, Abstract No. 9670a, Columbus, Ohio U.S.; K. W. Browall; "Electrode–induduced beta battery degredation. Final report"& Report 1983, Nyserda–84–9; Order No. T18490102, 35PP.

*Primary Examiner*—Stephen Kalafut
*Attorney, Agent, or Firm*—Parkhust, Wendel & Burr

[57] ABSTRACT

A sodium sulfur cell comprising an anode active material of metallic sodium, and a cathode active material of sulfur or sodium polysulfide, and a beta alumina solid electrolyte separator, the above active materials containing, as an impurity, calcium of at most 20 ppm and/or potassium of at most 200 ppm, by weight. The cell of the invention has excellent characteristics, particularly prolonged electromotive life.

10 Claims, 4 Drawing Sheets

FIG_1

FIG_2

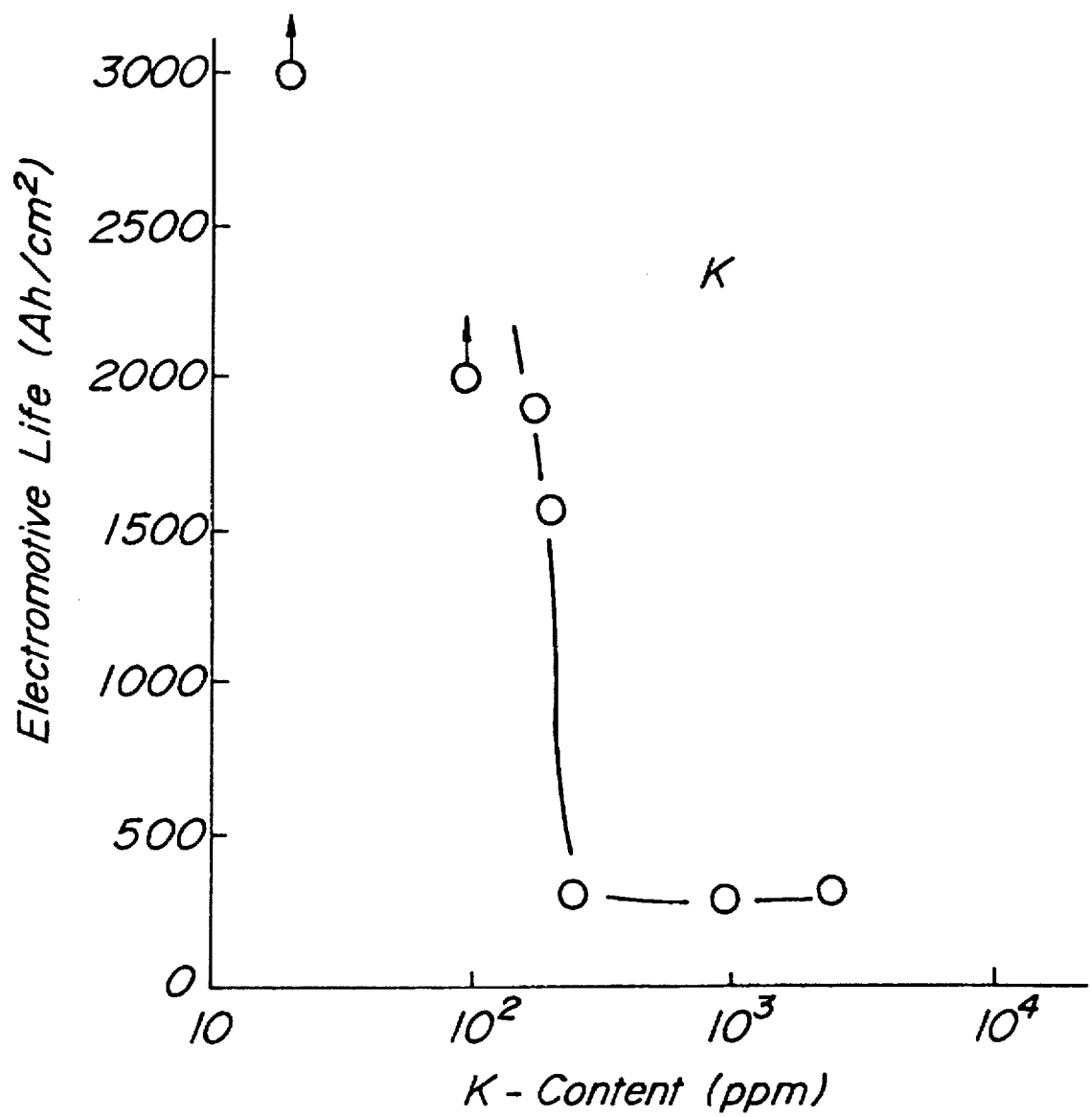
FIG_4

SODIUM SULFUR CELL AND PROCESS OF MANUFACTURING THE SAME

This is a Continuation of application Ser. No. 07/555,633 filed Jul. 23, 1990, now abandoned.

BACKGROUND OF THE INVENTION

1. Field of the Invention

The present invention relates to secondary batteries to be used for electric power load leveling or electric vehicles, and particularly to sodium sulfur cells adaptable for achieving prolongation of life thereof and a process for manufacturing the same.

2. Related Art Statement

Sodium sulfur cells are high temperature type secondary cells which operate at 300° C.–350° C. and are composed of molten sodium as an anode active material, molten sulfur and/or sodium polysulfide as a cathode active material, a sodium ion conductive ceramic as a solid electrolyte, and a metallic container. The structure of a typical sodium sulfur cell is shown in FIG. 1.

In FIG. 1, the numeral 1 indicates a sodium ion conductive beta alumina tube having a closed tip end, 2 is a metallic container functioning as a cathode, 3 is sulfur or sodium polysulfide, 4 is a metallic container functioning as an anode, 5 is sodium, 6 is a ring insulator such as an α-alumina, and 7 is a metallic lid. As the beta alumina 1, there are β"-alumina, β-alumina, and mixture of the both, or the like.

Processes for manufacturing the above-described sodium sulfur cells generally comprise the steps of: bonding the open end periphery of the prepared β-alumina tube 1 with the ring insulator 6 of α-alumina or the like, by means of glass-soldering or the like; further bonding the ring insulator 6 supporting the β-alumina tube 1, with the metallic containers 2 and 4, by a solid phase reaction or the like at a high temperature under pressure, to form upper and lower spaces; then loading the metallic containers 4 and 2 with sodium 5 and sulfur or sodium polysulfide 3, respectively; and hermetically closing the metallic containers 2 and 4 with the lids 7, 7', by means of welding 8, 8' or the like, to provide a cell.

In the sodium sulfur cells having the above-described structure, if a current concentration, an overvoltage on the end of charging or discharging, or impurity inclusion in the active materials occurs, there have arisen problems of fracturing of the beta alumina tube and impairment of charging or discharging efficiency as the resistance increases. In particular, though the impurity inclusion into the active materials is a serious problem, no attention has so far been paid, in the manufacture of the sodium sulfur cells, in respect of what kind of impurities and what degree of inclusion will cause the problems.

SUMMARY OF THE INVENTION

An object of the present invention is to solve the above-mentioned problems and, by defining contents of specified impurities in the active materials, provide sodium sulfur cells with various characteristics not impaired.

A further object of the present invention is to provide a process for manufacturing such a sodium sulfur cell.

The sodium sulfur cells according to the present invention comprising a cathode active material, an anode active matrial and a beta alumina solid electrolyte separating said active materials from each other, are characterized in that at least one of said active materials contains a restricted amount of impurity: (1) at most 20 ppm by weight of calcium, (2) at most 200 ppm by weight of potassium, or (3) at most 20 ppm and at most 200 ppm, by weight, of calcium and potassium, respectively.

Furthermore, the process according to the present invention for manufacturing a sodium sulfur cell comprising a cathode active material, an anode active material and a beta alumina separator separating the above active materials from each other, is characterized by using, as at least one of said cathode active material and anode active material, a material containing, as an impurity, calcium in an amount of at most 20 ppm by weight and potassium in an amount of at most 200 ppm by weight.

In the above-described construction, it has been found that various characteristics, specifically electromotive life, are improved according to the present invention, when, among impurities expected to be included in the active materials, the calcium content is restricted to at most 20 ppm, preferably at most 10 ppm, and/or the potassium content is restricted to at most 200 ppm, preferably at most 100 ppm, by weight.

The reason why the calcium content should be limited to at most 20 ppm by weight is because, if it exceeds 20 ppm by weight, the electromotive life will be extremely deteriorated, as will be clear from the below-described Examples. This is caused by a resistance increase due to accumulation of $Ca^{2+}$ ion-exchanged for $Na^+$, on the surface as well as in the grain boundary of the beta alumina.

Alternatively, the reason why the potassium content should be limited to at most 200 ppm by weight is because, if it exceeds 200 ppm by weight, the electromotive life will be also extremely deteriorated, as will be clear from the below-described Examples. This is caused by deterioration of the beta alumina strained by ion-exchange of $K^+$ for $Na^+$ in the beta alumina. Such an ion-exchange readily occurs as $K^+$ has an ion radius of 1.4 times that of $Na^+$.

BRIEF DESCRIPTION OF THE DRAWINGS

The present invention will be explained in more detail hereinafter by way of example with reference to the appended drawings wherein:

FIGS. 3 and 4 are graphs showing relations of inclusion amounts, respectively of calcium and potassium, with an electromotive life.

DESCRIPTION OF THE PREFERRED EMBODIMENTS

Example 1

Figure 2:
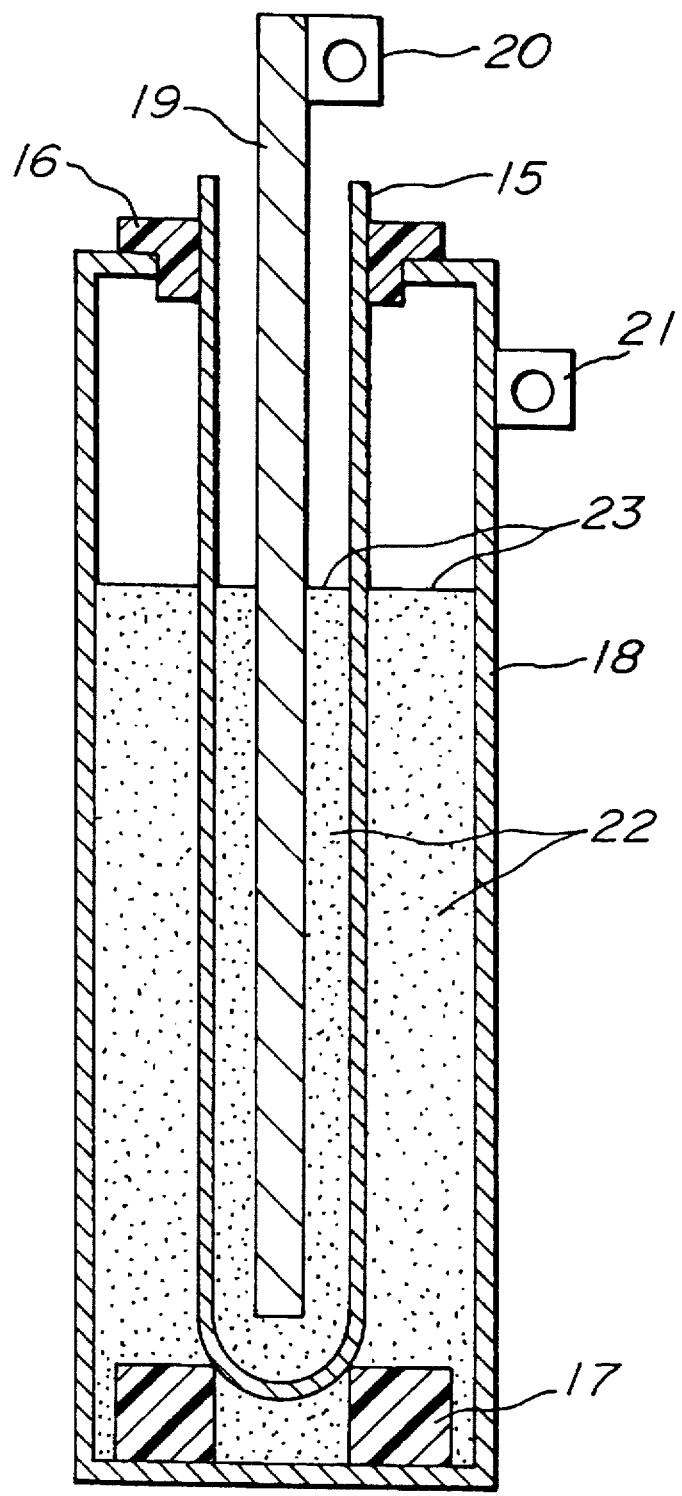
FIG. 2 is a vertical sectional view showing an electromotion test of the cell of the present invention.

A beta alumina tube of a predetermined shape was prepared. Using a cathode active material containing a restricted impurities and an anode active material (i.e., sodium) an electromotion test was conducted with an Na/Na electromotion testing apparatus as shown in FIG. 2. Referring to FIG. 2, the Na/Na electromotion testing apparatus was composed of a beta alumina tube 15 to be tested, α-alumina insulative supports 16, 17, a stainless steel container 18, a stainless steel electrode 19 and electrode terminals 20, 21. The container 18 and beta alumina tube 15 were charged with molten sodium 22. By flowing a constant electric current between the terminals 20 and 21, the electromotive life of the beta alumina tube 15 to be tested was determined. The reason why the electromotion test was conducted in the state of Na/Na instead of Na/S was to determine the pure electromotive force in the state of beta alumina tube alone by eliminating other factors, such as difference in contact resistance caused by S, and the like. Furthermore, in FIG. 2, the molten sodium 22 was fed into the stainless steel container 18 so that the sodium liquid level 23 might reach 40 mm below the top end of the beta alumina tube 15. The beta alumina tube 15 had an inside diameter of 17.6 mm, an outside diameter of 20.0 mm and a length of 140 mm.

Current was applied at a temperature of 350° C. with a current density of 1 A/cm$^2$, reversing the positive pole and negative pole every 120 seconds to minimize fluctuation of the sodium liquid level. An initial polarization value immediately after commencement of flowing the current was denoted by $V_1$. When the polarization value during current flowing increased to 1.5 times or more the initial polarization value $V_1$ or when it decreased to half or less of $V_1$, the life was regarded as exhausted and the test was stopped. An electromotive life $J_h$ (Ah/cm$^2$) was found from the period of time from commencement of flowing the current to the stop of the test. After stopping the test, Na was removed with ethanol and the outer appearance of the beta alumina tube was visually inspected. Here, the initial polarization value $V_1$ is found from the equation: $V_1=V_{1a}-V_{1b}$, where $V_{1a}$ is a voltage between the electrode terminals 20 and 21 at a constant current density, and $V_{1b}$ is a voltage between the electrode terminals 20 and 21 when the beta alumina tube 15 has been removed and the loaded sodium short-circuits.

Figure 3:
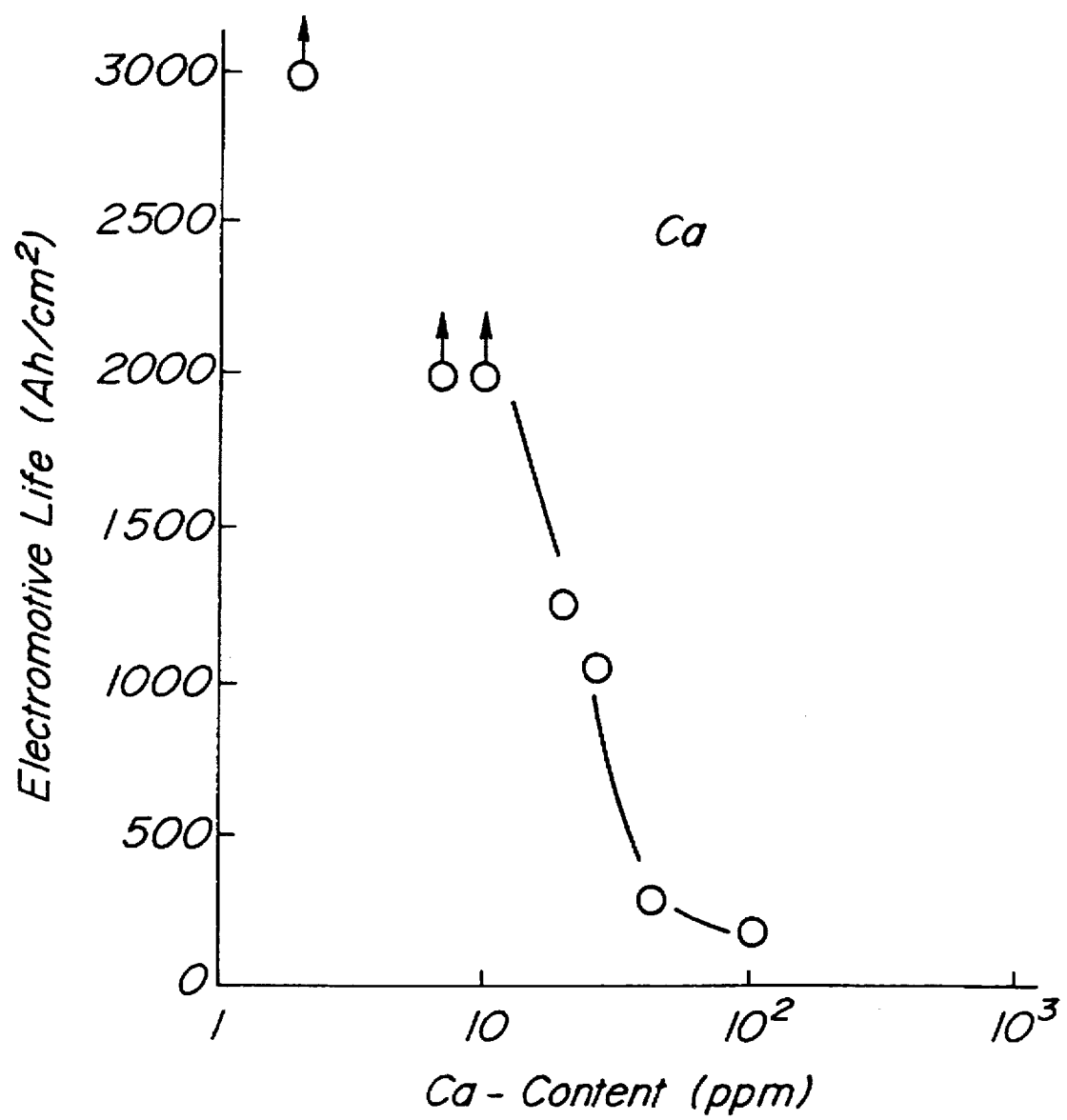

In Table 1 and FIG. 3, shown is the result of the electromotive life when the potassium content was made constant at 20 ppm by weight and the calcium content was regulated. In Table 2 and FIG. 4, shown is the result of the electromotive life when the calcium content was made constant at 2 ppm by weight and the potassium content was regulated. The concentration of the impurities was found by a chemical analysis of Na. Further, other impurities included in the employed Na were 3 ppm Fe and less than 1 ppm Cr, by weight.

TABLE 1

| No. | Ca-content (wt ppm) | Electromotive life (Ah/cm$^2$) |
|---|---|---|
| Present invention | | |
| 1 | 2 | ≥3000 |
| 2 | 7 | ≥2000 |
| 3 | 10 | ≥2000 |
| 4 | 20 | 1268 |
| Comparative Example | | |
| 5 | 27 | 1070 |
| 6 | 44 | 290 |
| 7 | 205 | 180 |

TABLE 2

| No. | K-content (wt ppm) | Electromotive life (Ah/cm$^2$) |
|---|---|---|
| Present invention | | |

TABLE 2-continued

| No. | K-content (wt ppm) | Electromotive life (Ah/cm$^2$) |
|---|---|---|
| invention | | |
| 1 | 20 | ≥3000 |
| 2 | 95 | ≥2000 |
| 3 | 180 | 1810 |
| 4 | 200 | 1650 |
| Comparative Example | | |
| 5 | 250 | 313 |
| 6 | 960 | 290 |
| 7 | 2400 | 310 |

It can be understood from the results shown in Tables 1 and 2 that the present invention wherein the calcium content is 20 ppm or less, or the potassium content is 200 ppm or less, by weight, provides a prolonged electromotive life, as compared with Comparative tests run outside the scope of the invention.

Example 2

Figure 1:
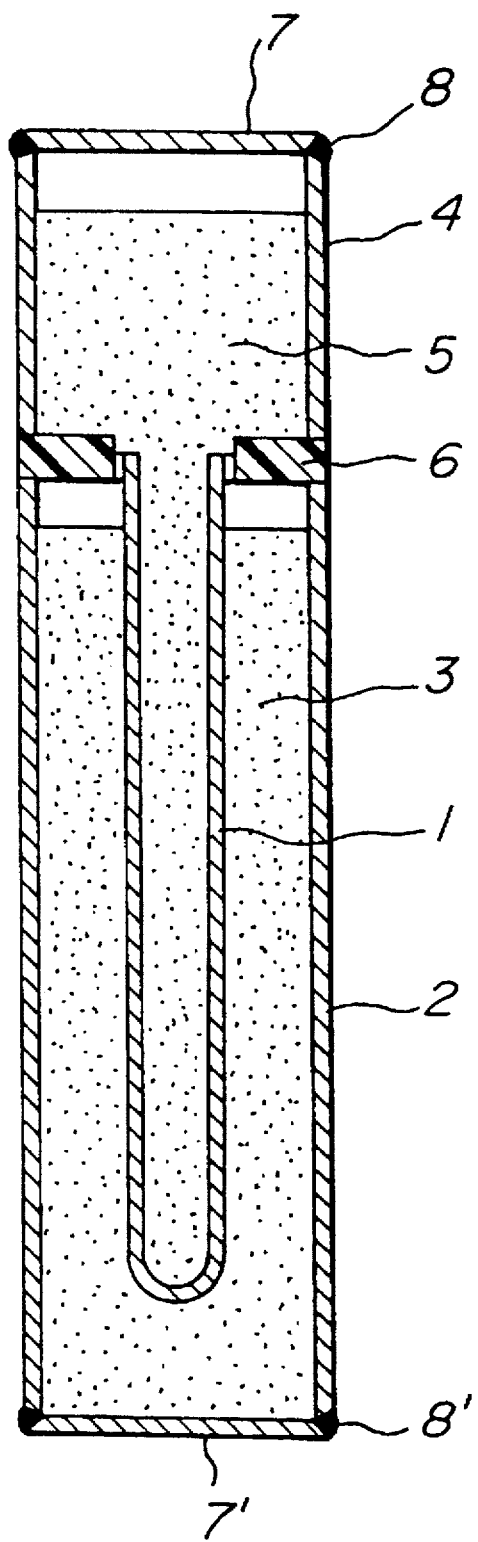
FIG. 1 is a vertical sectional view of an embodiment of the sodium sulfur cell according to the present invention.

A sodium sulfur cell as shown in FIG. 1 was actually assembled. As an anode active material, sodium containing K and Ca in regulated amounts and, as a cathode active material, sulfur containing K and Ca also in regulated amounts, were prepared. These active materials were charged into the cell and a charge-discharge test was conducted at a temperature of 350° C. with a current density of 100 mA/cm$^2$ in an 8 hour-cycle. The concentration of the impurities was found by chemical analysis. Further, other impurities included in the employed Na were 6 ppm Fe and 2 ppm Cr, by weight, and those included in the employed S were less than 3 ppm Fe and less than 3 ppm Li, by weight. In the discharge test, when a mean value $V_{BC}$ over the period of charging or a mean value $V_{BD}$ over the period of discharging, of the voltage drop $V_B$ due to the resistance of the cell, increased to 1.5 times or more, or decreased to half or less, of the value in the first charge-discharge cycle, the life was regarded as exhausted. Then, an electromotive life $J_h$ (Ah/cm$^2$) was found from the period of time from commencement of flowing the current to the stop of the test. Here established is an equation, $V_B=|V_I-V_{OCV}|$, where $V_I$ represents a voltage between cell electrodes at the above-described constant current density, and $V_{OCV}$ represents an electromotive force when the cell electrodes circuit is opened. The results are shown in Table 3.

TABLE 3

| | Cathode | | Anode | | Life of | |
|---|---|---|---|---|---|---|
| No. | K-content (ppm) | Ca-content (ppm) | K-content (ppm) | Ca-content (ppm) | cell (Ah/cm$^2$) | Remarks |
| present invention | | | | | | |
| 1 | <3 | <3 | 19 | 2 | ≥1000 | |
| 2 | 85 | <3 | 90 | 2 | ≥1000 | |
| 3 | 170 | <3 | 185 | 2 | ≥1000 | |
| 4 | <3 | 8 | 19 | 9 | ≥1000 | |
| 5 | <3 | 17 | 19 | 15 | 894 | Resistance increased |
| 8 | 170 | <3 | 230 | 2 | 533 | Resistance increased |

TABLE 3-continued

| No. | Cathode K-content (ppm) | Cathode Ca-content (ppm) | Anode K-content (ppm) | Anode Ca-content (ppm) | Life of cell (Ah/cm²) | Remarks |
|---|---|---|---|---|---|---|
| 7 Comparative Example | <3 | 23 | 19 | 9 | 816 | Resistance increased |
| 6 | 300 | <3 | 277 | 2 | 247 | Resistance increased |
| 9 | 300 | <3 | 424 | 2 | 190 | β-alumina tube fractured after resistance increased |
| 10 | <3 | 44 | 19 | 32 | 243 | Resistance increased |
| 11 | <3 | <3 | 424 | 32 | 145 | Resistance increased |

It can be understood from the results shown in Table 3 that satisfactory cell life is obtained according to the present invention wherein the K and Ca contents in sodium as an anode active material and/or in sulfur as a cathode active material are restricted to not more than the defined amounts, as compared with the Comparative Examples outside the scope of the invention.

As is clear from the above explanation, according to the process of the invention for manufacturing sodium sulfur cells wherein, among the impurities expected to be included in the active materials, tolerances of K and Ca are limited, sodium sulfur cells having excellent characteristics, particularly a prolonged electromotive life, can be obtained.

What is claimed is:

1. A sodium sulfur cell comprising a cathode active material, an anode active material and a beta alumina solid electrolyte separating said active materials from each other, wherein said anode active material contains, as impurities, calcium in an amount of 2–20 ppm by weight, and potassium in an amount of 20–200 ppm by weight, and said cathode active material contains, as impurities, calcium in an amount not greater than 20 ppm by weight, and potassium in an amount not greater than 200 ppm by weight.

2. The sodium sulfur cell of claim 1, wherein said calcium is contained in said active materials in an amount of not greater than 10 ppm by weight.

3. The sodium sulfur cell of claim 1, wherein said potassium is contained in said active materials in an amount of not greater than 100 ppm by weight.

4. The sodium sulfur cell of claim 1, wherein the calcium and potassium are contained in said active materials in amounts of not greater than 10 ppm and not greater than 100 ppm by weight, respectively.

5. A sodium sulfur cell comprising a cathode active material, an anode active material and a beta alumina solid electrolyte separating said active materials from each other, said sodium sulfur cell being produced by loading each of said active materials into said sodium sulfur cell, wherein said anode active material contains, as impurities, calcium in an amount of 2–20 ppm by weight and potassium in an amount of 20–200 ppm by weight, and said cathode active material contains, as impurities, calcium in an amount not greater than 20 ppm by weight, and potassium in an amount not greater than 200 ppm by weight.

6. The sodium sulfur cell of claim 5, wherein said calcium is contained in said active materials in an amount of not greater than 10 ppm by weight.

7. The sodium sulfur cell of claim 5, wherein said potassium is contained in said active materials in an amount of not greater than 100 ppm by weight.

8. The sodium sulfur cell of claim 5, wherein the calcium and potassium are contained in said active materials in amounts of not greater than 10 ppm and not greater than 100 ppm by weight, respectively.

9. A process for manufacturing a sodium sulfur cell, comprising the steps of:

providing a cathode active material, an anode active material and a beta alumina solid electrolyte to separate said active materials from each other, said anode active material containing, as impurities, calcium in an amount of 2–20 ppm by weight and potassium in an amount of 20–200 ppm by weight, and said cathode active material containing, as impurities, calcium in an amount not greater than 20 ppm by weight, and potassium in an amount not greater than 200 ppm by weight; and loading said active materials into the sodium sulfur cell.

10. The process of claim 9, wherein the calcium and potassium are contained in each of the active materials in amounts of not greater than 10 ppm and 100 ppm by weight, respectively.

* * * * *